(12) United States Patent
Baker et al.

(10) Patent No.: US 7,573,464 B2
(45) Date of Patent: Aug. 11, 2009

(54) SHAPE ADAPTABLE RESISTIVE TOUCHPAD

(75) Inventors: Jeffrey R. Baker, Thousand Oaks, CA (US); Michael Errico, Camarillo, CA (US); Carlos Solis Sanchez, Oxnard, CA (US)

(73) Assignee: Interlink Electronics, Inc., Camarillo, CA (US)

( * ) Notice: Subject to any disclaimer, the term of this patent is extended or adjusted under 35 U.S.C. 154(b) by 561 days.

(21) Appl. No.: 11/489,922

(22) Filed: Jul. 20, 2006

(65) Prior Publication Data
US 2008/0018609 A1 Jan. 24, 2008

(51) Int. Cl.
*G06F 3/041* (2006.01)
(52) U.S. Cl. ..................................... 345/173
(58) Field of Classification Search ......... 200/502–517; 345/156, 173–178
See application file for complete search history.

(56) References Cited

U.S. PATENT DOCUMENTS

| | | | |
|---|---|---|---|
| 4,079,194 A | 3/1978 | Kley | |
| 4,129,747 A | 12/1978 | Pepper, Jr. | |
| 4,296,406 A | 10/1981 | Pearson | |
| 4,314,227 A | 2/1982 | Eventoff | |
| 4,314,228 A | 2/1982 | Eventoff | |
| 4,475,008 A | 10/1984 | Doi et al. | |
| 4,482,883 A | 11/1984 | Heredero | |
| 4,489,302 A | 12/1984 | Eventoff | |
| 4,494,105 A | 1/1985 | House | |
| 4,598,181 A | 7/1986 | Selby | |
| 4,620,062 A | 10/1986 | Mizzi et al. | |
| 4,623,757 A | 11/1986 | Marino | |
| 4,687,885 A | 8/1987 | Talmage, Jr. | |
| 4,736,191 A | 4/1988 | Matzke et al. | |
| 4,739,299 A | 4/1988 | Eventoff et al. | |
| 4,752,655 A | 6/1988 | Tajiri et al. | |
| 4,798,919 A | 1/1989 | Miessler et al. | |
| 4,810,992 A | 3/1989 | Eventoff | |
| 4,996,511 A | 2/1991 | Ohkawa et al. | |
| 5,008,497 A | 4/1991 | Asher | |
| 5,151,677 A | 9/1992 | Gernet et al. | |
| 5,159,159 A * | 10/1992 | Asher ...................... | 178/18.05 |
| 5,296,837 A | 3/1994 | Yangier | |
| 5,302,936 A | 4/1994 | Yaniger | |
| 5,353,004 A | 10/1994 | Takemoto et al. | |
| 5,357,065 A | 10/1994 | Mitamura | |
| 5,539,159 A | 7/1996 | Protheroe et al. | |
| 5,543,589 A * | 8/1996 | Buchana et al. .......... | 178/18.03 |
| 5,659,334 A | 8/1997 | Yaniger et al. | |

(Continued)

FOREIGN PATENT DOCUMENTS

JP 352056957 5/1977

(Continued)

*Primary Examiner*—Srilakshmi K Kumar
(74) *Attorney, Agent, or Firm*—Brooks Kushman P.C.

(57) ABSTRACT

A touchpad includes a first substrate and a second substrate, at least one of which is flexible. A resistor on the first substrate has a narrow shape dividing the first substrate into two regions. A set of conductors in electrical contact with the resistor extend from the resistor into the two regions. A second resistor and at least one second substrate conductor in electrical contact with the second resistor are on the second substrate. This construction allows the touchpad to have an outer shape is not restricted by the need for rectangular coordinates.

18 Claims, 8 Drawing Sheets

U.S. PATENT DOCUMENTS

| | | |
|---|---|---|
| 5,828,363 A | 10/1998 | Yaniger et al. |
| 5,942,733 A | 8/1999 | Allen et al. |
| 5,943,044 A | 8/1999 | Martinelli et al. |
| 5,952,912 A | 9/1999 | Bauer et al. |
| 5,989,700 A | 11/1999 | Krivopal |
| 6,087,925 A | 7/2000 | DeVolpi |
| 6,102,802 A | 8/2000 | Armstrong |
| 6,115,030 A | 9/2000 | Berstis et al. |
| 6,121,869 A | 9/2000 | Burgess |
| 6,137,475 A | 10/2000 | Ginn et al. |
| 6,184,124 B1 | 2/2001 | Hasegawa et al. |
| 6,208,271 B1 | 3/2001 | Armstrong |
| 6,225,814 B1 | 5/2001 | Oreper et al. |
| 6,259,439 B1 * | 7/2001 | Lippincott ............ 345/549 |
| 6,313,731 B1 | 11/2001 | Vance |
| 6,323,840 B1 | 11/2001 | Steinbrunner |
| 6,331,849 B1 | 12/2001 | VandenBoom |
| 6,351,205 B1 | 2/2002 | Armstrong |
| 6,404,323 B1 | 6/2002 | Schrum et al. |
| 6,531,951 B2 | 3/2003 | Serban |
| 6,590,177 B2 | 7/2003 | Takahashi et al. |
| 6,756,555 B2 | 6/2004 | Lin |
| 7,046,230 B2 | 5/2006 | Zadesky et al. |
| 7,050,045 B2 | 5/2006 | Baker et al. |
| 2002/0007677 A1 | 1/2002 | Coates |
| 2002/0024503 A1 | 2/2002 | Armstrong |
| 2002/0055384 A1 | 5/2002 | Armstrong |
| 2002/0104369 A1 | 8/2002 | Baker et al. |
| 2002/0192939 A1 | 12/2002 | Sugihara |
| 2004/0130528 A1 | 7/2004 | Baker et al. |
| 2006/0250373 A1 | 11/2006 | Sakurai et al. |
| 2007/0296709 A1 | 12/2007 | GuangHai |
| 2008/0007534 A1 | 1/2008 | Peng et al. |
| 2008/0018608 A1 | 1/2008 | Serban et al. |

FOREIGN PATENT DOCUMENTS

| | | |
|---|---|---|
| JP | 11-194863 | 7/1999 |
| JP | 11-194872 | 7/1999 |

* cited by examiner

SHAPE ADAPTABLE RESISTIVE TOUCHPAD

BACKGROUND OF THE INVENTION

1. Field of the Invention

The present invention relates to touchpads.

2. Background Art

There is a constant need for improved human-machine interfaces in small portable devices such as laptop and palmtop computers, portable phones, portable entertainment players, video games, personal digital assistants, remote controls, and the like. This need is driven by increasing functionality and the convergence of functions into single devices. Cell phones, for example, now often include a camera, personal digital assistant, video and audio download and playback, web browsing, and multiple types of messaging.

Touchpads are a very versatile class of user input devices. When used with a graphical user interface (GUI), touchpads can be used to input relative motion, absolute position selection, scrolling, text input, and the like. Defined by the paradigm of rectangular coordinates, most touchpads are by default rectangular. Computer screens are rectangular and laptops themselves are rectangular. Thus, the operating principle of most touchpads is also rectangular.

One example of a rectangular touchpad is referred to as a four-wire rectangular resistive touchpad. In this device, two resistive plates are separated by a small air gap. One plate, referred to as the horizontal plate, has vertical highly conductive traces at each end. The other plate, referred to as the vertical plate, has horizontal highly conductive traces at each end. These plates are rectangular and the traces are orthogonal. Each plate is energized in turn by placing a voltage across its end traces so that the voltage across the plate drops linearly from one end to other. While one plate is energized, the non-energized plate is connected to a voltage measuring circuit. When a user touch brings the two plates into contact, the measured voltage is proportional to the touched distance along the energized plate. Both electrically and logically, this four-wire touchpad sets up a rectangular coordinate system. Most non-rectangular plates are not possible in this paradigm, since the position-indicating voltages would be distributed in patterns which would be difficult to detect and resolve.

The traditional rectangular paradigm has several disadvantages. The first is that many tasks that may be performed using a touchpad are not necessarily rectangular. A typical use, moving a cursor between two points, could just as easily be viewed as native to a polar coordinate system.

A second shortcoming is aesthetic. Small handheld devices are often viewed as fashion accessories. In a competitive market, designers seek to differentiate their products by appearance and shapes other than rectangular may be more attractive.

A third reason to consider a non-rectangular touchpad is a lack of space. Non-rectangular shapes may be easier to arrange within an array of other input or output components.

A fourth reason is that, on small touchpads, corners are difficult to reach. In contrast, a small round touchpad has all edges equally accessible.

What is needed is a resistive touchpad configuration that can be easily and inexpensively adapted to a wide variety of touchpad applications, including non-rectangular applications.

SUMMARY OF THE INVENTION

The present invention provides a touchpad whose outer shape is not restricted by the paradigm of rectangular coordinates. Specifically, the present invention provides a touchpad having at least one plate having a relatively thin resistor from which extends thin conductive elements.

In one embodiment, the touchpad includes a first substrate and a second substrate. At least one of the substrates is flexible so that a touch to one brings a portion of the first substrate first surface into contact with the second substrate second surface. A first resistor is on the first surface. The first resistor has a narrow shape dividing the first surface into two regions. A first set of conductors on the first surface extends from the first resistor into the first surface first region and the first surface second region. The first set of conductors is in electrical contact with the first resistor. A second resistor is on the second substrate. At least one second surface conductor is in electrical contact with the second resistor.

Preferably, the first surface first region and the first surface second region are non-resistive and non-conductive, except for the conductors extending into the regions from the first resistor. In one embodiment, the conductors extend into each region like tines extending from the spine of a comb. Each conductor is electrically isolated from adjacent conductors except through the first resistor. Thus, if a voltage potential is applied across the length of the first resistor, each conductor in a given region will be at a different potential.

In an embodiment of the touchpad, the second resistor has a narrow shape dividing the second surface into a second surface first region and a second surface second region. The at least one second surface conductor is a second set of conductors extending from the second resistor into the second surface first region and the second surface second region.

The first resistor may be perpendicular to the second resistor or not. One or both of the first resistor and the second resistor may be straight or may be curved. One or both of the first substrate and the second substrate may be non-rectangular. One or both of the first surface and the second substrate may be non-rectangular. Conductors may extend perpendicularly from their electrically connected resistor or may extend at some other angle or angles.

In another embodiment, the touchpad renders a touched location in Cartesian coordinates. An insulative bottom surface is divided into two bottom regions by a bottom resistor. Each of the two bottom regions is covered by a set of parallel first thin conductors which extend from the bottom resistor. An insulative top surface is above and facing the bottom surface. The top surface is divided into two top regions by a top resistor. Each of the two top regions is covered by a set of parallel second thin conductors which extend from the top resistor. The conductors are arranged so that the second thin conductors are perpendicular to the first thin conductors.

In another embodiment, touchpad includes an insulative bottom surface divided into two bottom regions by a bottom resistor with each of the two bottom regions covered by a set of first thin conductors extending from the bottom resistor. An insulative top surface is above and facing the bottom surface. The top surface is divided into two top regions by a top resistor with each of the two top regions covered by a set of second thin conductors extending from the top resistor. The conductors are arranged so that the second thin conductors are orthogonal to the first thin conductors.

BRIEF DESCRIPTION OF THE DRAWINGS

Throughout the drawings, the same reference numbers are used on different drawings where components have similar construction or operate in a similar manner. This numbering is used for clarity and/or convenience and not as a limitation on the scope of the invention.

DETAILED DESCRIPTION OF THE PREFERRED EMBODIMENT(S)

Figure 1:
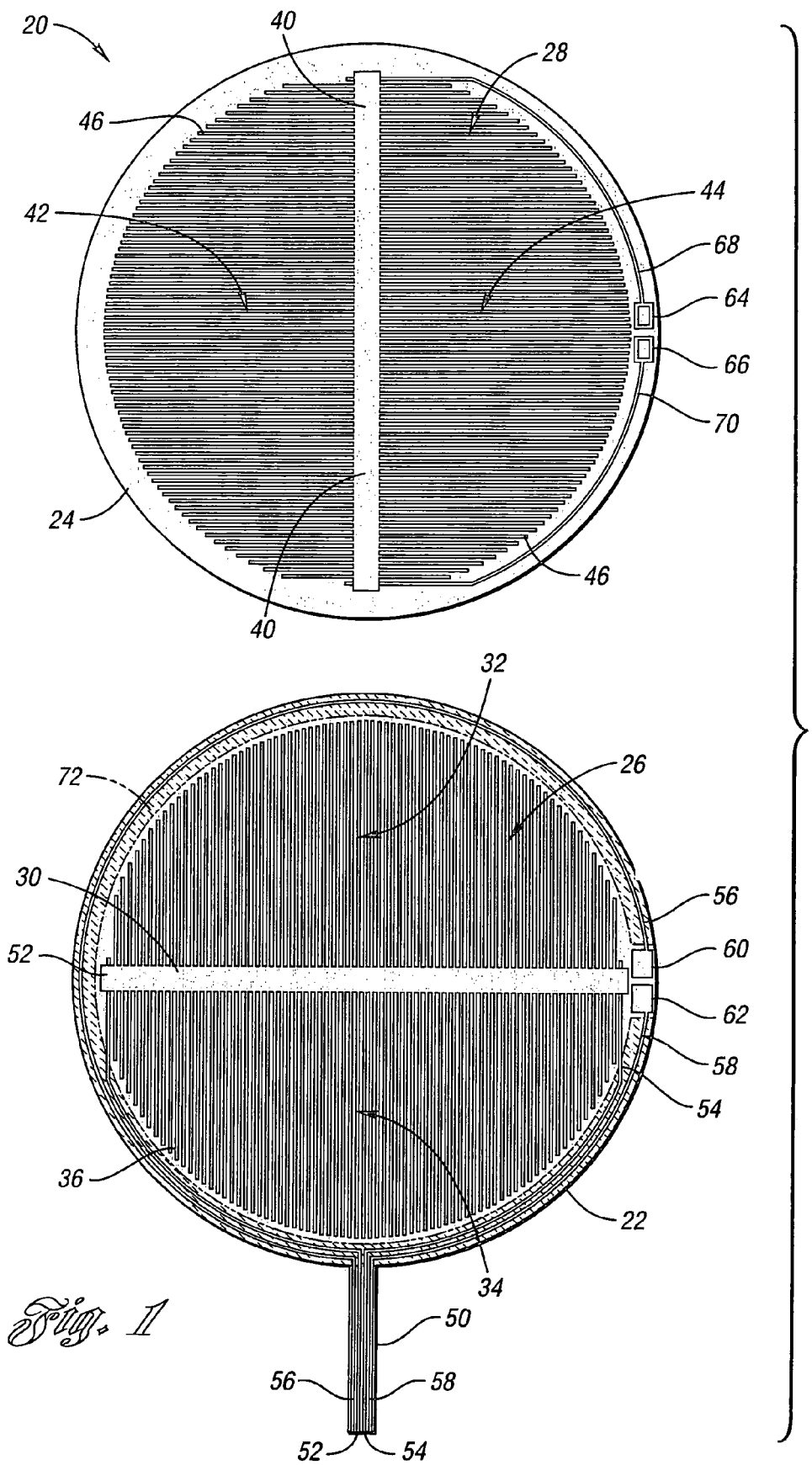
FIG. 1 is a schematic drawing illustrating a circular touchpad according to an embodiment of the present invention.

Referring to FIG. 1, a schematic drawing illustrating a circular touchpad according to an embodiment of the present invention is shown. In this embodiment a touchpad, shown generally by 20, measures rectilinear or Cartesian coordinates. Touchpad 20 includes bottom substrate 22 and top substrate 24. The terms top and bottom are used for ease of illustration. As will be readily recognized by one of skill in the art, a touchpad of the present invention may be oriented in any fashion.

Bottom substrate 22 includes a top surface, shown generally by 26. Top substrate 24 includes a bottom surface, shown generally by 28. When assembled, the substrates are aligned so that top substrate bottom surface 28 is positioned above bottom substrate top surface 26 in a spaced-apart manner. At least one of bottom substrate 22 and top substrate 24 is flexible so that, when one of the substrates 22, 24 is touched, a portion of top substrate bottom surface 28 is brought into contact with bottom substrate top surface 26. Various methods and constructions for such spaced-apart substrates forming touchpads are well known in the art.

Bottom substrate top surface 26 includes bottom resistor 30. Bottom resistor 30 is generally thin in shape compared to the area of bottom substrate top surface 26, and extends generally across bottom substrate top surface 26. Thus, bottom resistor 30 divides bottom substrate top surface 26 into first bottom region 32 and second bottom region 34. In the embodiment shown, regions 32 and 34 are the same size and symmetrical, although this need not be the case for all embodiments of the present invention.

Bottom substrate top surface 26 also includes a set of bottom conductors, some of which are indicated by 36. Each bottom conductor 36 extends from bottom resistor 30 into either of regions 32, 34. Each bottom conductor 36 makes electrical contact with bottom resistor 30. One way to describe this configuration is to say that bottom resistor 30 provides a resistive spine and that bottom conductors 36 extend as conductive tines from bottom resistor 30.

With the exception of resistor 30 and conductors 36, bottom substrate top surface 26 is non-conductive. Each conductor 36 is electrically isolated from adjacent conductors 36 except through bottom resistor 30. Thus, if a voltage is placed across the length of bottom resistor 30, each conductor 36 will be at a different potential from adjacent conductors 36. As will be recognized by one of ordinary skill in the art, conductors 36 may be metallic conductors or may be made from another material that has less resistance than bottom resistor 30. Conductors 36 may also be made from the same material as bottom resistor 30. In an embodiment, conductors 36 and bottom resistor 30 are printed at the same time using the same resistive material. The term "conductor" is used here for convenience, and not as a limitation in the construction of the invention. Similarly, bottom substrate top surface 26 need not be a strict dielectric material as long as its conductance is substantially less than the conductance of conductors 36.

Top substrate bottom surface 28 includes top resistor 40 dividing top substrate bottom surface 28 into first top region 42 and second top region 44. Top substrate bottom surface 28 also includes a set of top conductors, some of which are indicated by 46. Each top conductor 46 extends from top resistor 40 into either of regions 42, 44. Each top conductor 46 makes electrical contact with top resistor 40. In this embodiment, the construction and layout of top resistor 40 and top conductors 46 is the same as for bottom resistor 30 and bottom conductors 36 except that the layout of components on top substrate bottom surface is rotated 90° so that top conductors 46 are perpendicular to bottom conductors 36.

Electrical signals are routed to and from touchpad 20 through pigtail 50 attached to bottom substrate 22. Four conductors run along pigtail 50. First conductor 52 and second conductor 54 connect to either end of bottom resistor 30. Third conductor 56 and fourth conductor 58 encircle bottom substrate top surface 26 to make contact with conductive bottom first pad 60 and bottom second pad 62, respectively.

Top substrate 24 includes conductive top first pad 64 and top second pad 66. Fifth conductor 68 and sixth conductor 70 on top substrate 24 interconnect top first pad 64 and top second pad 66, respectively, with opposite ends of top resistor 40. When touchpad 20 is assembled, top first pad 64 makes electrical contact with bottom first pad 60. Similarly, top second pad 66 makes electrical contact with bottom second pad 62.

Spacer 72 encircles bottom substrate top surface 26. When assembled, spacer 72 separates bottom substrate 22 from top substrate 24. Preferably, spacer 72 is an adhesive spacer bonding bottom substrate 22 to top substrate 24. Spacer 72 preferably covers at least a portion of conductors 52, 54, 56, 58. Spacer 72 is illustrated as transparent in various figures so that details of conductors 52, 54, 56, 58 and other elements may be more clearly shown.

Figure 2:
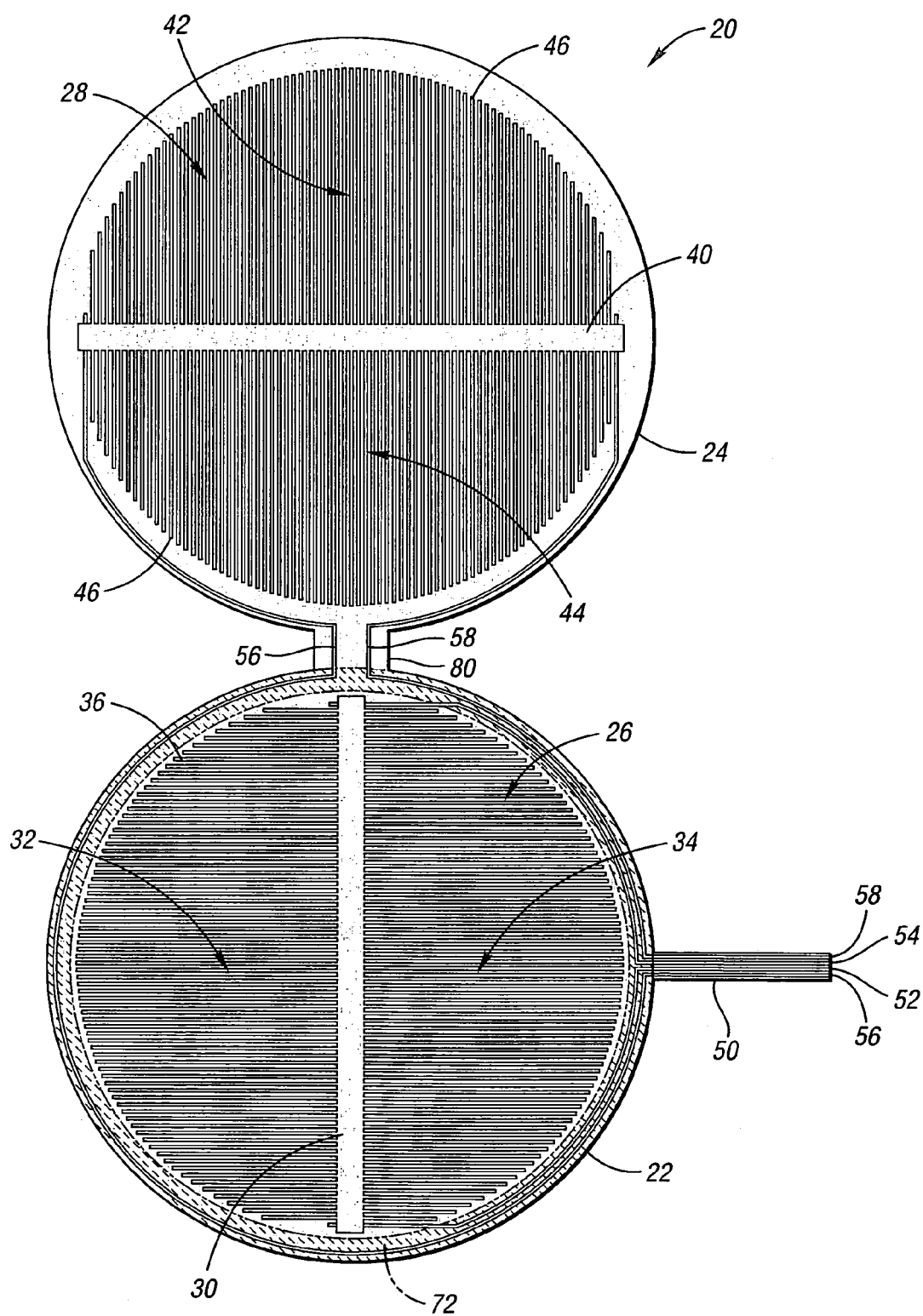
FIG. 2 is a schematic drawing illustrating a circular touchpad according to an embodiment of the present invention.

Referring now to FIG. 2, a schematic drawing illustrating a circular touchpad according to an alternative embodiment of the present invention is shown. In this embodiment, the configuration of bottom resistor 30, bottom conductors 36, top resistor 40, and top resistors 46 is substantially the same as in FIGS. 1A and 1B. However, bottom substrate 22 and top substrate 24 are physically joined by flap 80. When assembled, flap 80 bends, allowing top substrate bottom surface 28 to be positioned above bottom substrate top surface 26.

The use of flap 80 eliminates the need for bottom pads 60, 62, top pads 64, 66, and separate conductors 68, 70. Third conductor 56 and fourth conductor 58 cross flap 80 onto top substrate 24 to make contact with opposite ends of top resistor 40.

Figure 3:
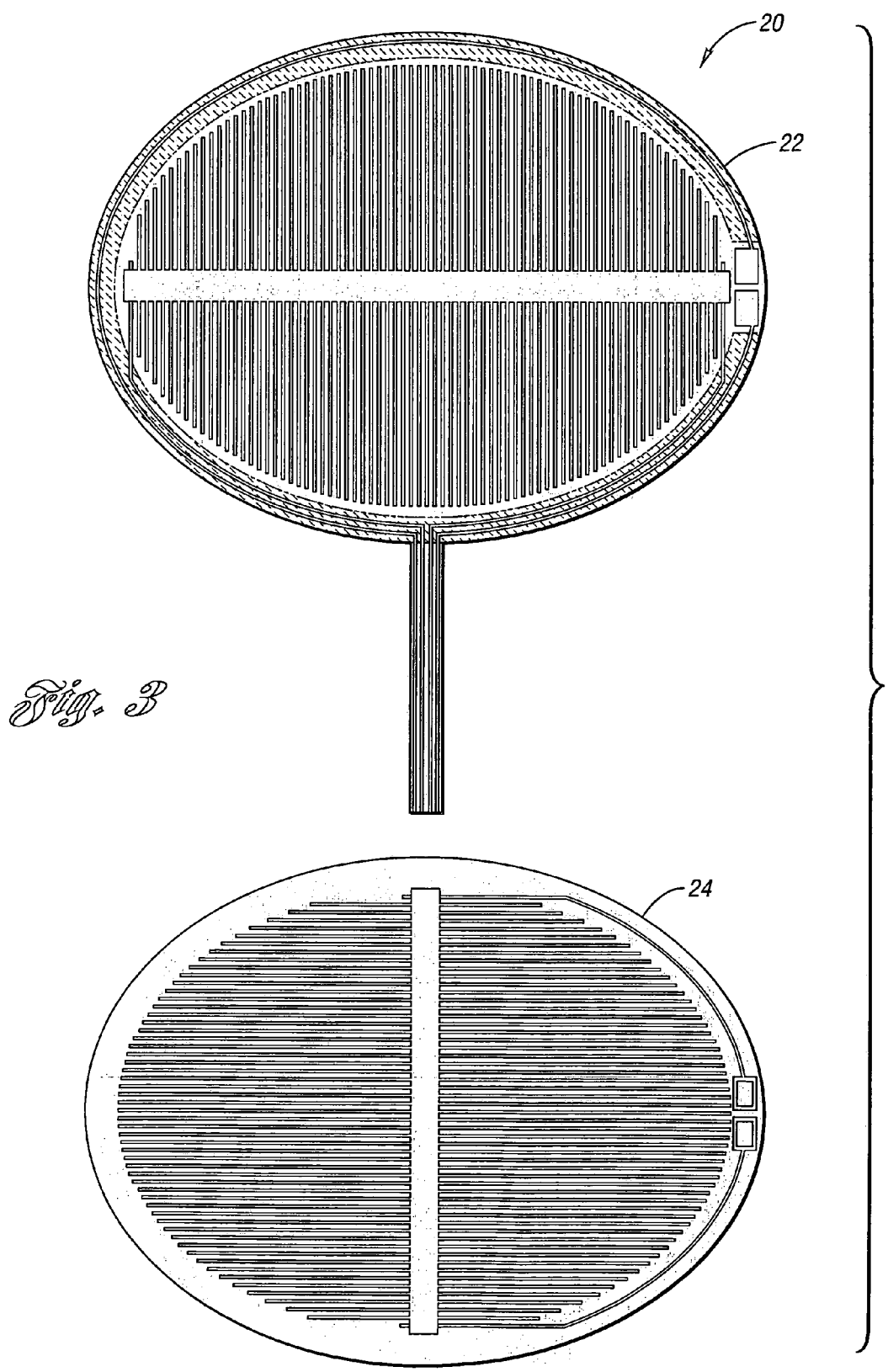
FIG. 3 is a schematic drawings illustrating an elliptical touchpad according to an embodiment of the present invention.

Referring now to FIG. 3, a schematic drawing illustrating an elliptical touchpad according to an embodiment of the present invention is shown. In this embodiment, touchpad 20 includes bottom substrate 22 and top substrate 24 having elliptical shapes. Elliptical touchpad 20 may be constructed in the same manner as described with regards to FIG. 1 above.

Figure 4:
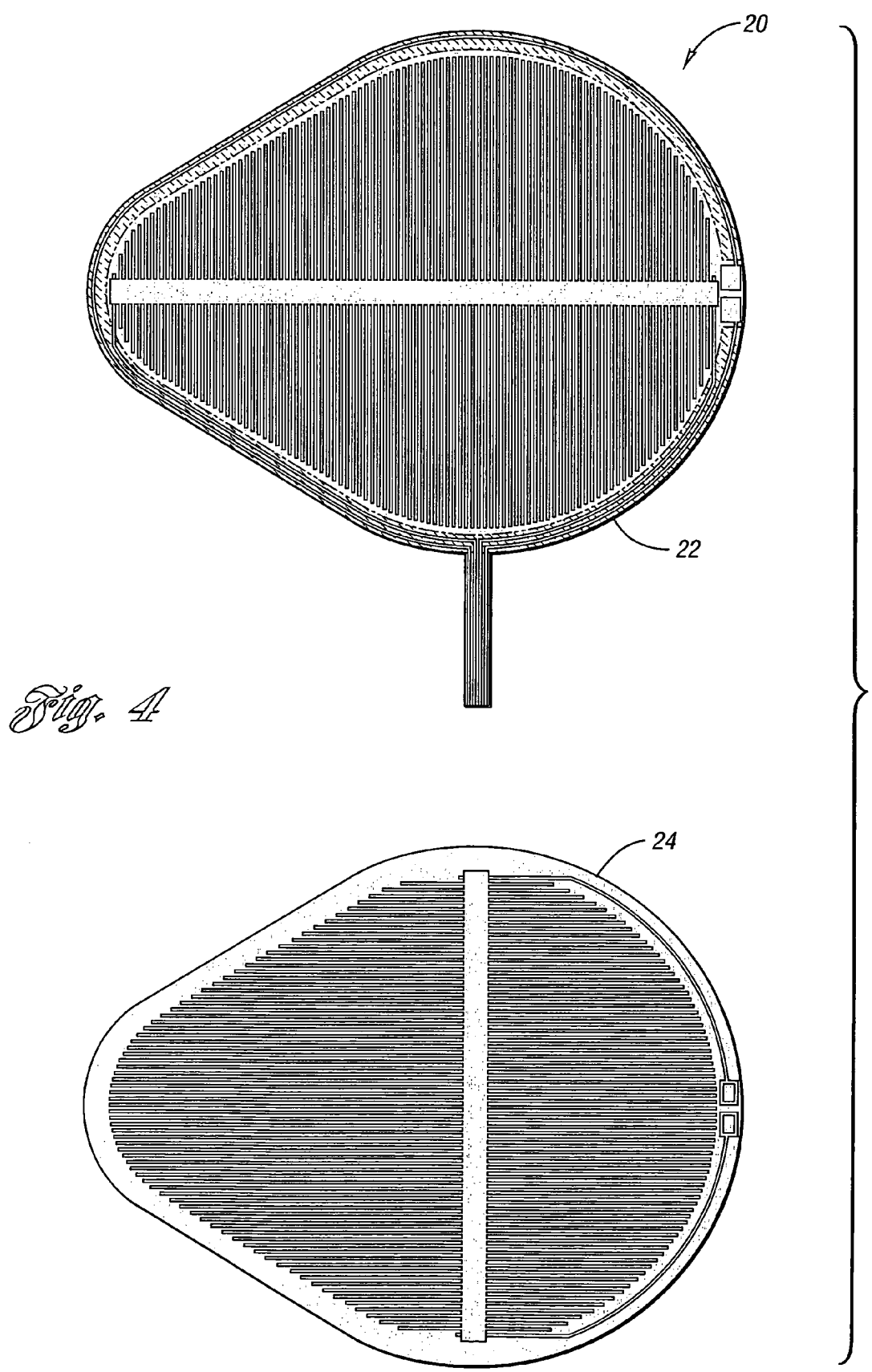
FIG. 4 is a schematic diagrams illustrating an irregularly shaped touchpad according to an embodiment of the present invention.

Referring now to FIG. 4, a schematic diagram illustrating an irregularly shaped touchpad according to an embodiment of the present invention is shown. An advantage of the present invention is the ability to form a touchpad having a wide variety of possibly irregular shapes. In this embodiment, touchpad 20 includes bottom substrate 22 and top substrate 24 having roughly pear shapes. Once again, irregularly shaped touchpad 20 may be constructed in the same manner as described with regards to FIG. 1 above.

Irregularly-shaped touch pads, such as illustrated in FIG. 4, may be used in a wide variety of applications. For example, the pear-shaped touch pad of FIG. 4 may be used in an electronic baseball game, with the pear shape mapping to a baseball playing field.

Figure 5:
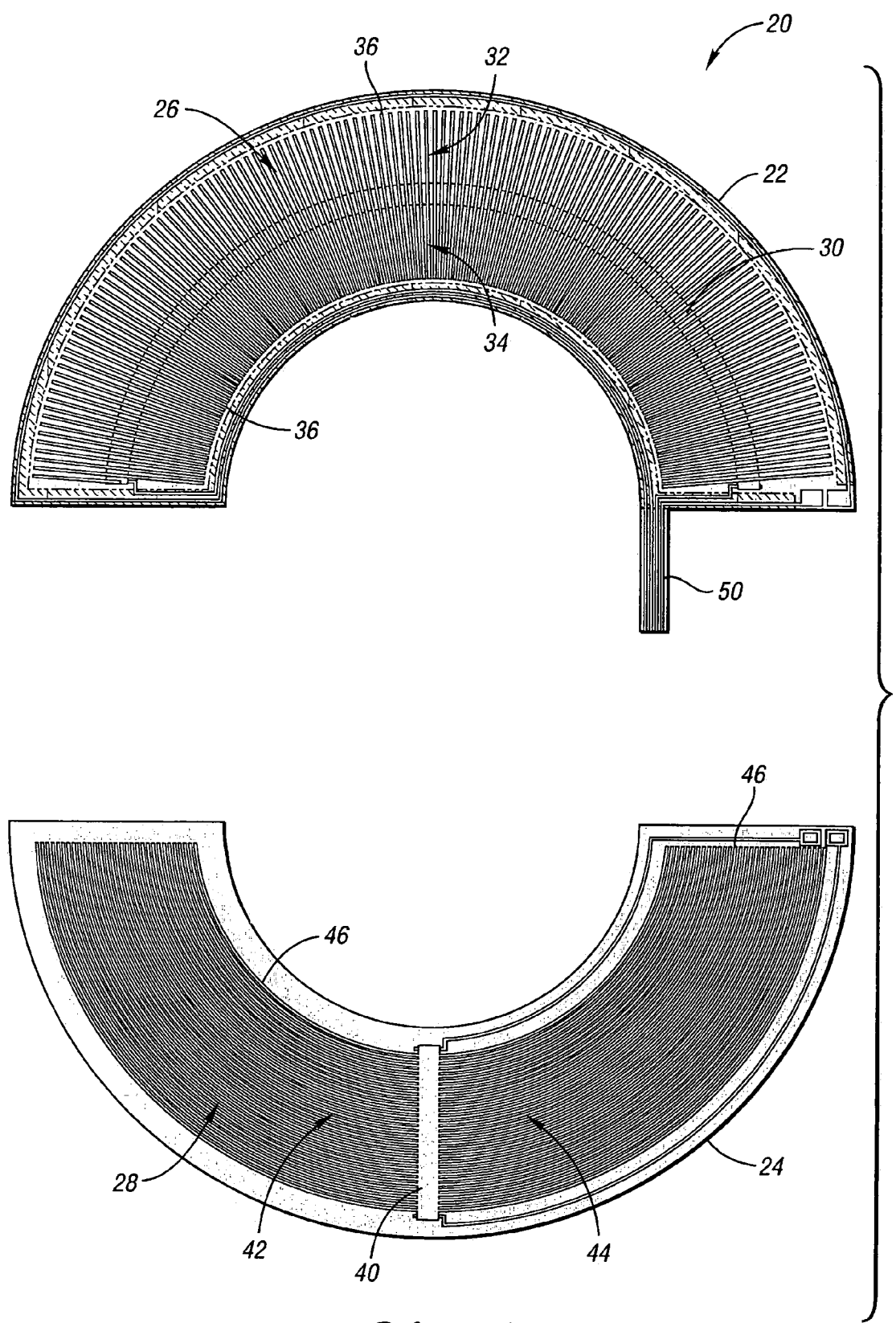
FIG. 5 is a schematic diagram illustrating a curvilinear touchpad according to an embodiment of the present invention.

Referring now to FIG. 5, a schematic diagram illustrating a curvilinear touchpad according to an embodiment of the present invention is shown. In this embodiment, touchpad 20 measures curvilinear or cylindrical coordinates. Touchpad 20 includes bottom substrate 22 and top substrate 24 each having curved sectional shape.

Bottom substrate top surface 26 includes bottom resistor 30 having a circular arc shape. Once again, bottom resistor 30 divides bottom substrate top surface 26 into first bottom region 32 and second bottom region 34. Bottom substrate top surface 26 also includes bottom conductors 36 extending from bottom resistor 30 into either of regions 32, 34. Each bottom conductor 36 makes electrical contact with bottom resistor 30. Thus, if a voltage is supplied across the length of arc-shaped bottom resistor 30, each bottom conductor 36 has a voltage potential promotional to the angular position of that conductor 36 about bottom substrate top surface 26.

Top substrate bottom surface 28 includes top resistor 40 dividing top substrate bottom surface 28 into first top region 42 and second top region 44. Top substrate bottom surface 28 also includes a set of top conductors, some of which are indicated by 46. Each top conductor 46 extends along an arc from top resistor 40 into either of regions 42, 44. Each top conductor 46 makes electrical contact with top resistor 40. Thus, if a voltage is applied across the length of top resistor 40, each top conductor 46 has a voltage potential proportional to the radial position of that conductor 46 about top substrate bottom surface 28.

Signals may be applied to and retrieved from touchpad curvilinear touchpad 20 through pigtail 50, such as described above with regard to FIG. 1.

Figure 6:
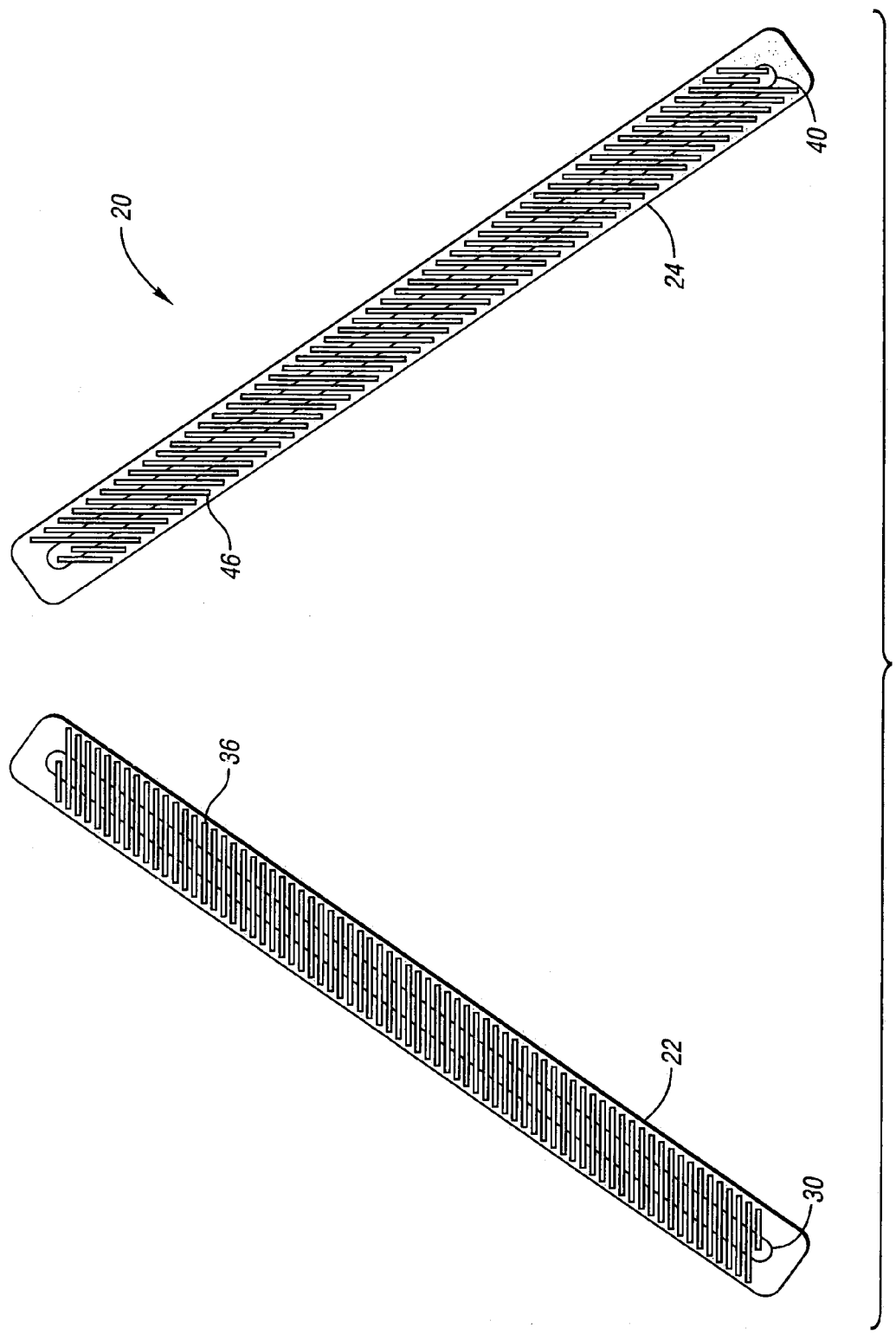
FIG. 6 is a schematic diagram illustrating a rectangular touchpad according to an embodiment of the present invention.

Referring now to FIG. 6, a schematic diagram illustrating a rectangular touchpad according to an embodiment of the present invention is shown. In this embodiment, touchpad 20 includes bottom substrate 22 and top substrate 24 having thin rectangular shapes. Rectangular touchpad 20 may be constructed in the same manner as described with regards to FIG. 1 above. One difference with touchpad 20 of FIG. 6 is that bottom resistor 30 and top resistor 40 may be parallel or collinear. In the embodiment shown, top conductors 36 are perpendicular to bottom conductors 46.

Figure 7:
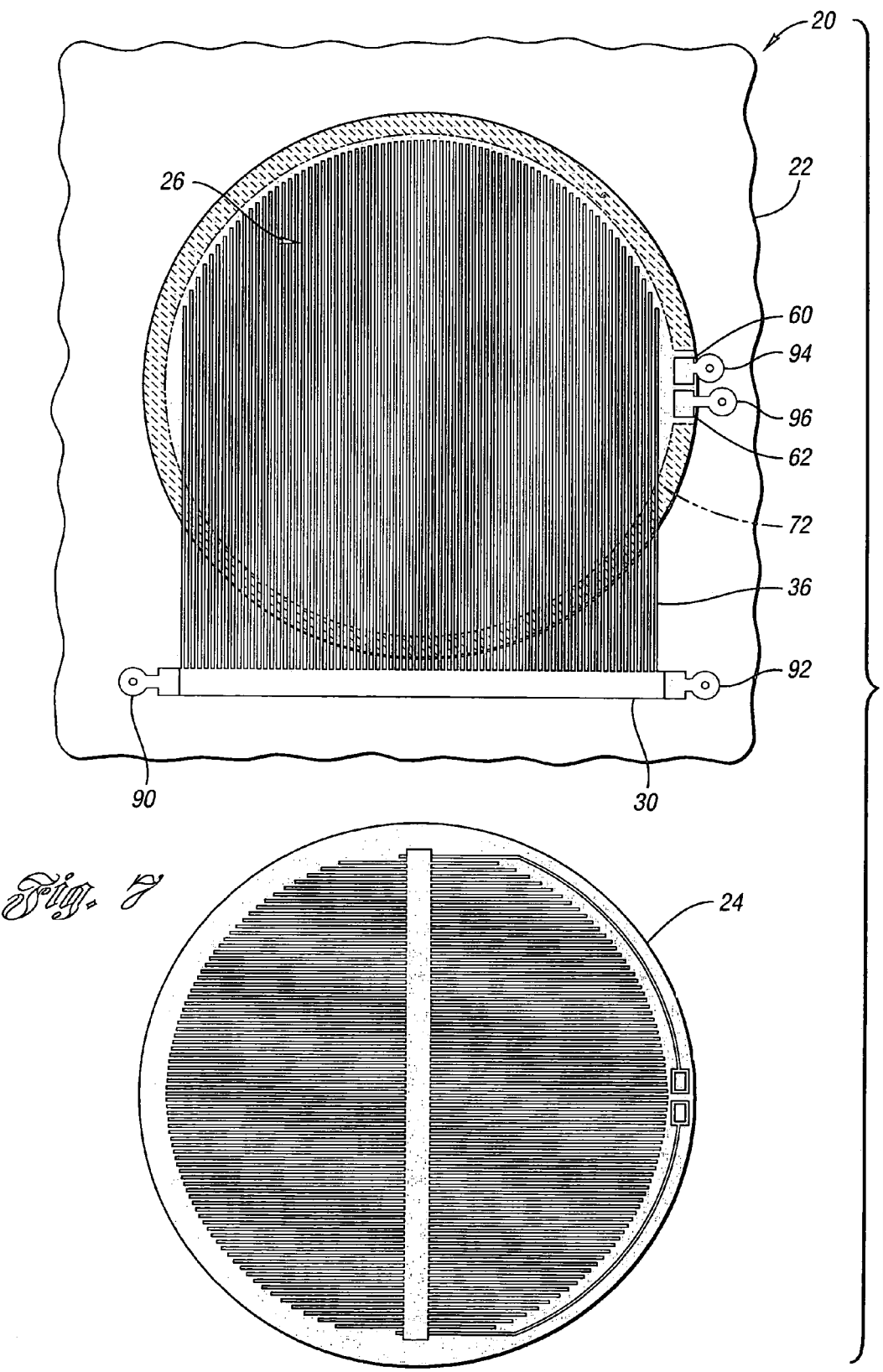
FIG. 7 is a schematic diagram illustrating another circular touchpad according to an embodiment of the present invention.

Referring now to FIG. 7, a schematic diagram illustrating another circular touchpad according to an embodiment of the present invention is shown. In this embodiment, bottom substrate 24 is a printed circuit board that may support other components such as, for example, electronics used to generate or process signals for touchpad 20. In this embodiment, bottom resistor 30 lies outside of bottom substrate top surface 26. Bottom conductors 36 extend from bottom resistor 30, under spacer 72, and into bottom substrate top surface 26. Electrical connections for bottom resistor 30, bottom first pad 60, and bottom second pad 62 are through vias 90, 92, 94, and 96, respectively. The construction of top substrate 24 including top resistor 40 and top conductors 46 may be as described above with reference to FIG. 1.

In an alternative embodiment, bottom substrate 22 may include a conventional resistive sheet across bottom substrate top surface 26 and conductors located on opposite sides of the resistive sheet, as is known in the art.

Figure 8A:
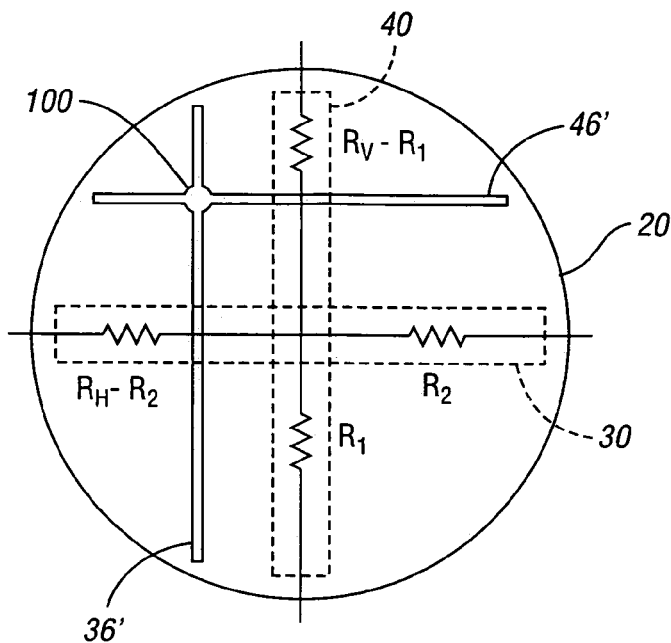
FIGS. 8A-8C are a schematic diagrams illustrating operation of a touchpad according to an embodiment of the present invention.
Figure 8B:
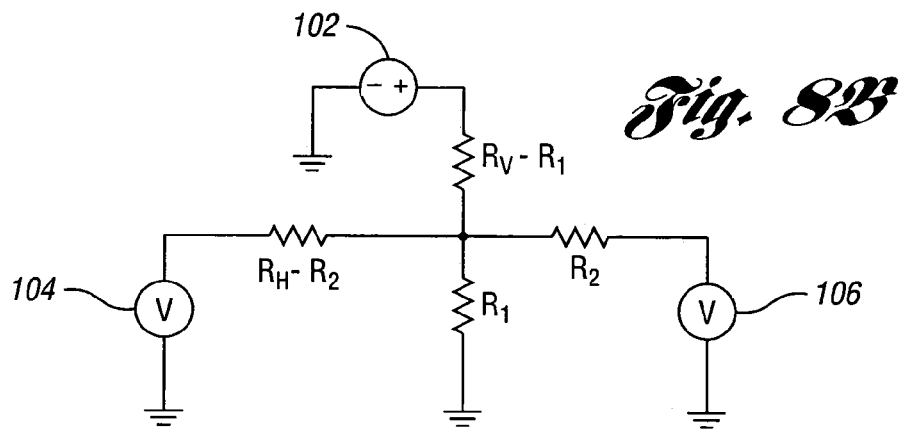
Figure 8C:
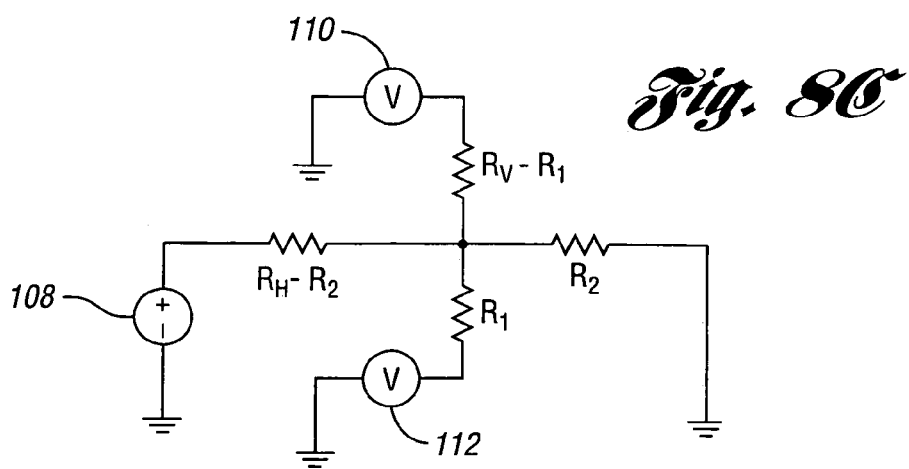

Referring now to FIGS. 8A-8C, schematic diagrams illustrating operation of a touchpad according to an embodiment of the present invention are shown. FIG. 8A illustrates a conceptualized electrical representation that results when touchpad 20 is touched bringing the bottom substrate top surface into contact with the top substrate bottom surface at contact point 100. Contact point 100 causes bottom conductor 36' to make electrical contact with top conductor 46'. Bottom resistor 30 has a total resistance of $R_H$. Bottom conductor 36' divides bottom resistor 30 into resistance values $R_2$ and $R_H$-$R_2$. Similarly, top resistor 40 has a total resistance of $R_V$. Top conductor 46' divides top resistor 40 into resistance values $R_1$ and $R_V$-$R_1$.

Referring now to FIG. 8B, an equivalent circuit for measuring "vertical" touch position is shown. Voltage supply 102 is connected across top resistor 40, setting up a voltage divider between equivalent resistances $R_1$ and $R_V$-$R_1$. Either or both of voltage sensor 104 and voltage sensor 106 are connected to bottom resistor 30. Because these voltage sensors have a high input impedance, the effects of equivalent resistors $R_2$ and $R_H$-$R_2$ are negligible on the measurement of voltage across $R_1$, which is proportional to the touched location in the vertical direction.

Referring now to FIG. 8C, an equivalent circuit for measuring "horizontal" touch position is shown. Voltage supply 108 is connected across bottom resistor 30, setting up a voltage divider between equivalent resistances $R_2$ and $R_H$-$R_2$. Either or both of voltage sensor 110 and voltage sensor 112 are connected to bottom resistor 40. Once again, because these voltage sensors have a high input impedance, the effects of equivalent resistors $R_1$ and $R_V$-$R_1$ are negligible on the measurement of voltage across $R_2$, which is proportional to the touched location in the horizontal direction.

The terms horizontal and vertical in this exemplary embodiment are used for ease of description only, and not to imply any particular orientation for touchpad 20. Voltage supplies 102, 110 and voltage sensors 104, 106, 110, 112 may be implemented using various techniques well known in the art. For example, dual input/output pins on a microprocessor having an analog-to-digital converter may be connected to touchpad 20 through conductors 52, 54, 56, 58, as shown in FIG. 1 above.

A wide variety of construction techniques can be used to make touchpads of the present invention. For example, one or both of the touchpad substrates could be constructed by chemical or laser etching of ITO on an ITO-coated substrate, resulting in a substantially clear touchpad.

One or more of the touchpad substrates may be constructed by screen printing polymer thick films on flexible substrates. Polymer thick film resistors and highly conductive inks are well known in the art. Also, transparent resistors and conductors made from materials, such as ORGACON™ EL-1500 from Agfa-Gevaert NV, Belgium, may be used.

One or more of the touchpad substrates may be constructed using traditional printed circuit board fabrication techniques, with backbone resistors added by printing resistive material or other processes. For example, one substrate may be fabricated on a traditional rigid PCB and the other substrate fabricated from a flexible material such as polyimide. A substrate may support other components such as a connector for mating with a utilization circuit. Alternately, a rigid substrate may be part of a larger circuit board that contains other components such as circuitry to support driving, measuring and utilizing the touchpad.

One or more of the touchpad substrates may be constructed using traditional printed circuit board fabrication techniques, with backbone resistors created by etching an embedded passive resistor layer such as Ohmega-Ply® from Ohmega Technologies, Inc., Culver City, Calif.

One substrate could connect another substrate using conductive traces running along a hinge or through a conductive adhesive. For example, such heat bonded films include the Anisotropic Conductive Film (ACF) Adhesive 7303 from 3M™, a heat bonded screen printed layer of conductive adhesive such as part number 3373C from Three Bond Co., Ltd., Tokyo, or any other appropriate conductive adhesive.

An adhesive spacer layer may be used to separate the top and bottom substrates. The adhesive spacer layer may be a die cut and laminated pressure sensitive adhesive film, it may be a screen printed pressure sensitive adhesive, or the like.

In various other embodiments, graphics could be applied to the top touchpad layer. An electroluminescent or light emitting polymer lamp could be formed in the top touchpad layer in order to light the touchpad, or to backlight icons in a graphic layer. The graphics, thin-film lighting, and touchpad layers could all be formed on the same substrate. The substrates and contacting surfaces may be shaped or formed to allow spaces for buttons or indicator lamps.

Various forms of connection methods may be used with the present invention. For example, a substrate could support a connector that mates to a connector in the host device. Alternatively, a substrate may include a tail that inserts into a connector in the host device, or has contact pads which are pressed by springs or pins in the host device. The flexible printed circuit plate could contain a traditional FPC tail for insertion into a connector in a host device. The bottom and top substrates could each have separate tails that plug into a common connector in the host device. The two tails could also connect to separate connectors.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A touchpad comprising:
   a first substrate having a first surface;
   a second substrate having a second surface, the second substrate positioned so that the second surface faces the first surface and the second substrate is spaced apart from the first substrate;
   wherein at least one of the first substrate and the second substrate is flexible, whereby a touch to one of the first substrate and the second substrate brings a portion of the first surface into contact with the second surface;
   a first resistor on the first surface, the first resistor having a narrow shape dividing the first surface into a first surface first region and a first surface second region;
   a first set of conductors on the first surface along the length of the first resistor and extending from the first resistor into the first surface first region and the first surface second region, the first set of conductors in electrical contact with the first resistor and electrically isolated from one another except through the first resistor, whereby if a voltage potential is applied across the length of the first resistor, each of the first set of conductors will be at different potentials from one another;
   a second resistor on the second substrate, the second resistor having a narrow shape dividing the second surface into a second surface first region and a second surface second region; and
   a second set of conductors along the length of the second resistor and extending from the second resistor into the second surface first region and the second surface second region, the second set of conductors in electrical contact with the second resistor and electrically isolated from one another except through the second resistor, whereby if a voltage potential is applied across the length of the second resistor, each of the second set of conductors will be at different potentials from one another.

2. The touchpad of claim 1 wherein the first resistor is perpendicular to the second resistor.

3. The touchpad of claim 1 wherein at least one of the first resistor and the second resistor is straight.

4. The touchpad of claim 1 wherein at least one of the first resistor and the second resistor is curved.

5. The touchpad of claim 1 further comprising a spacer layer separating the first substrate from the second substrate.

6. The touchpad of claim 1 wherein at least one of the first substrate and the second substrate is non-rectangular.

7. The touchpad of claim 1 wherein at least one of the first surface and the second surface is non-rectangular.

8. The touchpad of claim 1 wherein the first surface first region and the first surface second region are non-resistive.

9. The touchpad of claim 1 wherein the first set of conductors comprises conductive tines extending from the first resistor into the first surface first region and the first surface second region.

10. The touchpad of claim 1 wherein each conductor in the first set of conductors extends substantially perpendicularly from the first resistor.

11. A touchpad for rendering a touched location in Cartesian coordinates comprising:
   an insulative bottom surface divided into two bottom regions by a bottom resistor, each of the two bottom regions covered by a set of parallel first thin conductors which are along the length of the bottom resistor and extend from the bottom resistor, wherein the first thin conductors are electrically isolated from one another except through the bottom resistor, whereby if a voltage potential is applied across the length of the bottom resistor, each of the first thin conductors will be at different potentials from one another; and
   an insulative top surface above and facing the bottom surface, the top surface divided into two top regions by a top resistor, each of the two top regions covered by a set of parallel second thin conductors which are along the length of the top resistor and extend from the top resistor, the second thin conductors perpendicular to the first thin conductors, wherein the second thin conductors are electrically isolated from one another except through the top resistor, whereby if a voltage potential is applied across the length of the top resistor, each of the second thin conductors will be at different potentials from one another;
   wherein at least one of the bottom surface and the top surface is flexible.

12. The touchpad of claim 11 wherein at least one of the top surface and the bottom surface is non-rectangular.

13. The touchpad of claim 11 further comprising a spacer layer separating the top surface and the bottom surface.

14. A touchpad comprising:
   an insulative bottom surface divided into two bottom regions by a bottom resistor, each of the two bottom regions covered by a set of first thin conductors which are along the length of the bottom resistor and extend from the bottom resistor, wherein the first thin conductors are electrically isolated from one another except through the bottom resistor, whereby if a voltage potential is applied across the length of the bottom resistor, each of the first thin conductors will be at different potentials from one another; and
   an insulative top surface above and facing the bottom surface, the top surface divided into two top regions by a top resistor, each of the two top regions covered by a set of second thin conductors which are along the length of the top resistor and extend from the top resistor, the second thin conductors orthogonal to the first thin conductors, wherein the second thin conductors are electrically isolated from one another except through the top resistor, whereby if a voltage potential is applied across the length of the top resistor, each of the second thin conductors will be at different potentials from one another;
   wherein at least one of the bottom surface and the top surface is flexible.

15. The touchpad of claim 14 wherein at least one of the top surface and the bottom surface is non-rectangular.

16. The touchpad of claim 14 further comprising a spacer layer separating the top surface and the bottom surface.

17. The touchpad of claim 14 wherein at least one of the top resistor and the bottom resistor is curved.

18. The touchpad of claim 14 wherein at least one of the top resistor and the bottom resistor is straight.

\* \* \* \* \*

UNITED STATES PATENT AND TRADEMARK OFFICE
CERTIFICATE OF CORRECTION

PATENT NO. : 7,573,464 B2
APPLICATION NO. : 11/489922
DATED : August 11, 2009
INVENTOR(S) : Baker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 583 days.

Signed and Sealed this

Fourteenth Day of December, 2010

David J. Kappos
*Director of the United States Patent and Trademark Office*